United States Patent
Swan

(10) Patent No.: US 9,205,348 B2
(45) Date of Patent: Dec. 8, 2015

(54) VAPOR RECOVERY APPARATUS AND METHOD FOR OIL AND GAS WELLS

(71) Applicant: Randy Swan, Granbury, TX (US)

(72) Inventor: Randy Swan, Granbury, TX (US)

( * ) Notice: Subject to any disclaimer, the term of this patent is extended or adjusted under 35 U.S.C. 154(b) by 0 days.

(21) Appl. No.: 14/625,769

(22) Filed: Feb. 19, 2015

(65) Prior Publication Data

US 2015/0231525 A1  Aug. 20, 2015

Related U.S. Application Data

(60) Provisional application No. 61/942,327, filed on Feb. 20, 2014.

(51) Int. Cl.
*B01D 1/02* (2006.01)
*B01D 3/00* (2006.01)

(52) U.S. Cl.
CPC .... *B01D 3/00* (2013.01); *B01D 1/02* (2013.01)

(58) Field of Classification Search
CPC .. B01D 1/0011; B01D 1/0041; B01D 1/0047; B01D 1/0058; B01D 1/0076; B01D 1/02; B01D 1/06; B01D 1/12
See application file for complete search history.

(56) References Cited

U.S. PATENT DOCUMENTS

| | | | |
|---|---|---|---|
| 1,753,401 A | 4/1930 | Bucking | |
| 2,309,075 A | 1/1943 | Hill | |
| 2,970,107 A | 1/1961 | Gilmore | |
| 3,073,129 A | 1/1963 | Grenier | |
| 4,602,923 A | 7/1986 | Bernstein | |
| 4,824,447 A | 4/1989 | Goldsberry | |
| 6,209,642 B1 | 4/2001 | Streetman | |
| 7,033,420 B2 | 4/2006 | Liebig | |
| 7,255,540 B1 | 8/2007 | Cooper | |
| 7,780,766 B2 | 8/2010 | Thompson | |
| 2011/0168017 A1* | 7/2011 | Lamers | 95/22 |
| 2013/0270194 A1* | 10/2013 | Allen | 210/747.4 |
| 2015/0090122 A1 | 4/2015 | Hemstock | |

FOREIGN PATENT DOCUMENTS

CA  1244778  11/1988

* cited by examiner

*Primary Examiner* — Duane Smith
*Assistant Examiner* — Phillip Shao
(74) *Attorney, Agent, or Firm* — Geoffrey A. Mantooth; Brian K. Yost

(57) ABSTRACT

A vapor recovery apparatus has a first vessel forming a column with upper and lower ends. Liquid, such as oil containing gas enters the bottom of the first column and flows op to a liquid outlet. Heat is applied to the rising oil, wherein the oil foams. Gas escapes into the upper end. The foam flows into a second column and along a roughened surface. The bubbles in the foam break apart, releasing the gas. The oil flows down the second column to an outlet. A compressor may be used to withdraw the gas and provide hot compressed gas to beat the rising oil in the first column.

12 Claims, 4 Drawing Sheets

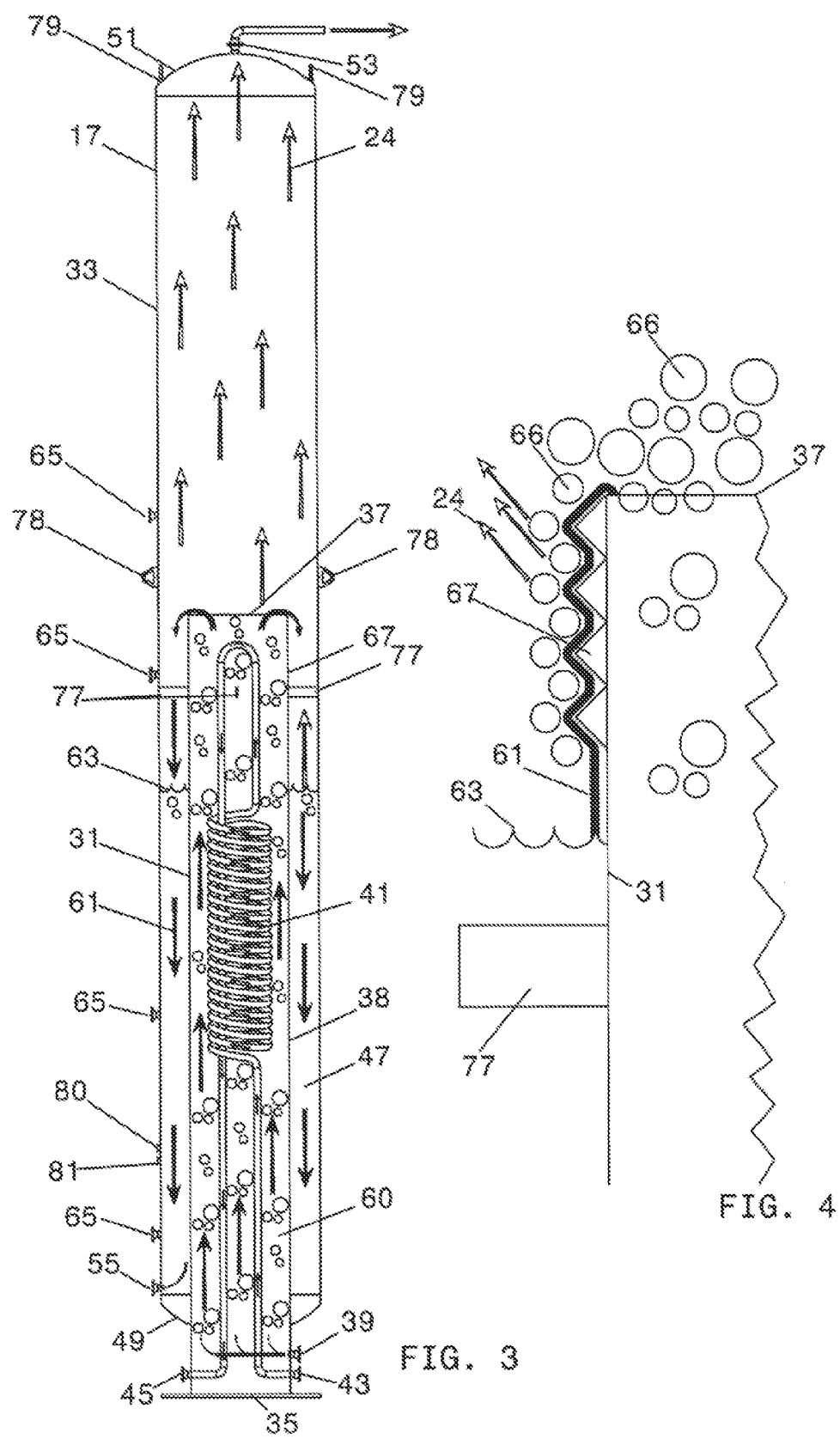

VAPOR RECOVERY APPARATUS AND METHOD FOR OIL AND GAS WELLS

FIELD OF THE INVENTION

The present invention relates to vapor recovery systems for wells, oil and gas processing facilities and the accompanying surface storage tanks and related equipment.

BACKGROUND OF THE INVENTION

Liquids, such as erode oil, condensate and water, produced from wells typically contain gasses such as natural gas and liquid petroleum gas (LPG). Large amounts of oil, condensate and water that are produced are stored in storage tanks, awaiting transport, further processing or refining. When liquid is stored in a storage tank, gas contained in the liquid can separate or vaporize due to a variety of factors. For example, if the liquid experiences a pressure drop, then vapors will flash off. If the liquid level in the storage tank changes, or the liquid is agitated, the gas separates. If the tank is subjected to temperature swings or barometric pressure changes, gas can also separate from, the liquid.

Due to environmental and economic reasons, it is desirable to capture these gasses. Capturing the gasses allows the gas to be sold. Alternatively, the gas can be burned. Venting the gas into the atmosphere is generally frowned upon and in most cases is restricted or requires permits.

Furthermore, providing liquid with gasses that can vaporize into a storage tank results in pressure changes inside the tank. As the pressure changes, atmospheric air may be drawn into the storage tank. Oil equipment operators, and in particular pipeline operators, do not want atmospheric air, with oxygen, introduced into their equipment due to problems with corrosion.

Thus, it is desirable to put so called "dead" oil without gasses, (and other degassed liquids) into storage tasks. Dead oil does not produce gas inside of a storage tank, even when subjected to agitation, pressure drops, or temperature changes.

In the prior art, various types of equipment exists to separate and capture gas from liquid before the liquid is provided to a storage tank. One such type of equipment is known as a vapor recovery tower (VRT). The vapor recovery tower separates the gas from liquid in such a manner so as not to introduce air into the storage tank.

The prior art vapor recovery tower, while removing much of the gas from the liquid, is not particularly efficient in that significant quantities of gas can still be provided to the liquid flowing into a storage tank.

It is desired to provide a more efficient vapor recovery tower and method.

SUMMARY OF THE INVENTION

A vapor recovery apparatus processes liquid produced from a well. The produced liquid contains gas. The apparatus comprises inner and outer vessels. The inner vessel has a closed lower end, an intermediate portion, a liquid inlet and a liquid outlet. A first liquid path extends between the liquid inlet and the liquid outlet. The inner vessel liquid output is vertically above the liquid inlet. The outer vessel has a closed lower end and a closed upper end, and an interior. The inner vessel liquid outlet and inner vessel portions are located in the outer vessel interior, the inner vessel liquid outlet communicates with the outer vessel interior. A liquid outlet is located in a lower portion of the second vessel. A gas outlet is at the outer vessel upper end. A heat exchanger is located so as to provide heat to liquid located in the first liquid path. A second liquid path extends from where the liquid enters the outer vessel from the inner vessel to a liquid level in the outer vessel.

In accordance with one aspect, the inner vessel lower end is located exteriorly of the outer vessel.

In accordance with another aspect the liquid inlet is exterior of the outer vessel.

In accordance with still another aspect, the heat exchanger comprises a heat exchanger inlet and a heat exchanger outlet. The heat exchanger inlet and the heat exchanger outlet, are located exteriorly of the outer vessel.

In accordance with another aspect, the inner vessel comprises an outer surface located in the outer vessel interior. The second liquid path comprises the inner vessel outer surface.

In accordance with another aspect, the loner vessel outer surface is roughened so as to have a larger surface area relative to a smooth surface.

In accordance with another aspect, the gas outlet is connected to a gas pipe. The gas pipe extends through the outer vessel interior to a location near the outer vessel bottom end, wherein the gas pipe exits the outer vessel.

In accordance with another aspect, the heat exchanger is located inside of the inner vessel, in the first liquid path.

In accordance with another aspect, the apparatus further comprises a compressor. The compressor receives gas from the gas outlet and provides compressed gas to the heat exchanger.

In accordance with, another aspect, the apparatus further comprises a liquid storage tank having an inlet that is connected to the outer vessel outlet.

In accordance with another aspect, the storage tank has a first level of liquid therein. The outer vessel has a second level of liquid that is the same as the first level of liquid.

In accordance with another aspect, an annulus is between the inner vessel intermediate portion and the outer vessel.

A method of recovering gas from liquid produced from a well, comprises providing a vessel and forming a first column of the liquid in the vessel, which first column, has a bottom region and a top region. The liquid is flowed in the first column from the bottom region to the top region. Heat is applied to the liquid flowing in the first column. The liquid is allowed to exit the first column and enter a second column in the vessel. The liquid flows in the second column from a top of the second, column toward a bottom of the second column. The gas is allowed to escape the first and second columns of liquid. The liquid is withdrawn from the vessel from the bottom of the second column. The escaped gas is collected from the vessel.

In accordance with one aspect, the heated liquid in the top region of the first column is foamed.

In accordance with one aspect, the foamed liquid exiting the first column is passed over a roughened surface so as to break apart bubbles in the foam and allow the gas to escape.

In accordance with another aspect, the escaped gas is collected by withdrawing the escaped, gas with a compressor, then compressing the gas and passing the compressed gas through a heat exchanger that applies the heat to the liquid flowing in the first column.

In accordance with another aspect, withdrawing the escaped gas with a compressor further comprises monitoring the pressure of the escaped gas and when the pressure exceeds a predetermined threshold, operating the compressor.

In accordance with another aspect, the step of withdrawing the liquid from the bottom of the second column further comprises providing the withdrawn liquid, to a storage tank.

In accordance with another aspect, the storage tank has a level of liquid and the second column of liquid has a level which follows the liquid level in the storage tank.

BRIEF DESCRIPTION OF THE DRAWINGS

FIG. 3 is a side cross-sectional view of the vapor recovery tower of the present invention, in accordance with a preferred embodiment.

FIG. 4 is a close up side view of liquid spilling over the top end of the inner vessel and traveling down.

DESCRIPTION OF THE PREFERRED EMBODIMENT

The vapor recovery apparatus and method processes fluid from an oil and gas well. The fluid contains one or more liquid components such as crude oil, condensate and water. The fluid also contains gasses such as natural gas and liquid petroleum gas. Many of the gasses easily vaporize are otherwise volatile. Vapors and volatile compounds are removed from the liquid in an efficient manner. The vapors and volatile compounds can be sold or flared off. The liquid is put into a storage vessel; the liquid is "dead", with the gasses removed therefrom. Dead liquid in storage vessels minimizes temperature related pressure changes within the vessel. Consequently, the admittance of atmospheric air into the storage vessel is minimized if not eliminated.

In the description of the preferred embodiment, the liquid is oil, although other liquids, such as water or condensate, can be processed.

The liquid flows through the vapor recovery apparatus in a passive manner. No pumps or agitators are needed.

Figure 1:
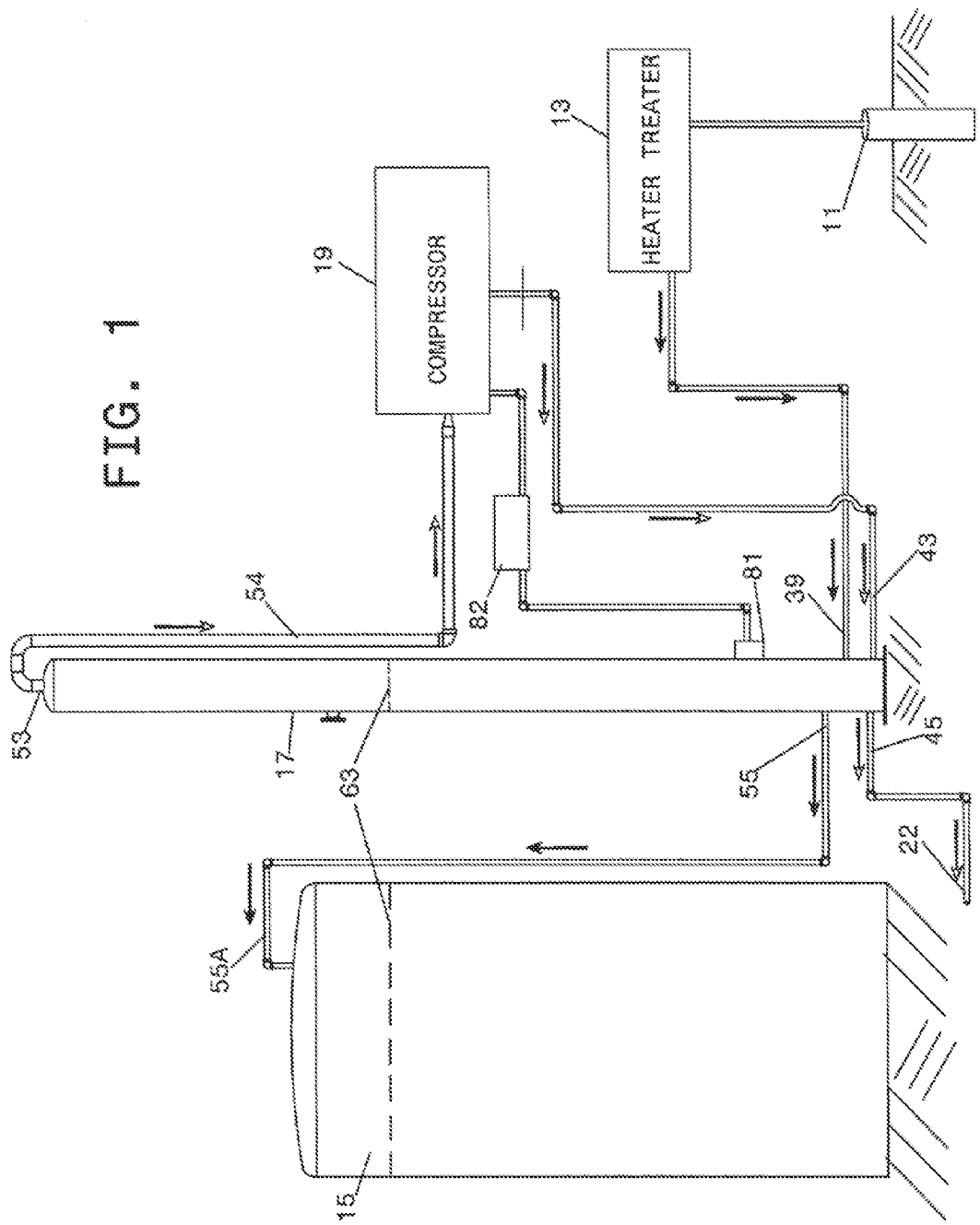
FIG. 1 is a diagram showing various surface components of a producing oil well, including a vapor recovery tower.

In FIG. 1, there is shown a producing oil well 11 with various surface equipment. Oil flows out of the well into a heater treater 13. Heater treaters are conventional and are used to process an emulsion of oil and water. Heat is applied to separate the water from the oil. Some of the gas that may be present is also separated. However, the oil may still retain gas. The removed water is stored in a water storage tank (act shown) or disposed of in some other fashion. An alternative to a heater treater is a separator which separates water from the oil. Oil exiting the separator may still retain gas. Oil exiting the heater treater 13 or separator is then routed to one or more oil storage tanks 15. Alternatively, the oil may be provided to a pipeline for transport.

Before the oil enters the storage tank 15, it is processed to remove vapors or volatile compounds by way of a vapor recovery tower 17. Vapors leave the upper end of the vapor recovery tower 17 and flow to a compressor 19. In the prior art, the compressed gas leaves the compressor 19 and flows directly to a sales line 22. However, as will be explained in more detail below, with the preferred embodiment, the compressed gas enters the vapor recovery tower.

Oil leaves the vapor recovery tower and flows into the storage tank 15. It is desired for the oil that is entering the storage tank 15 to be dead, or without gasses that can separate from the oil under normal atmospheric conditions.

Figure 2:
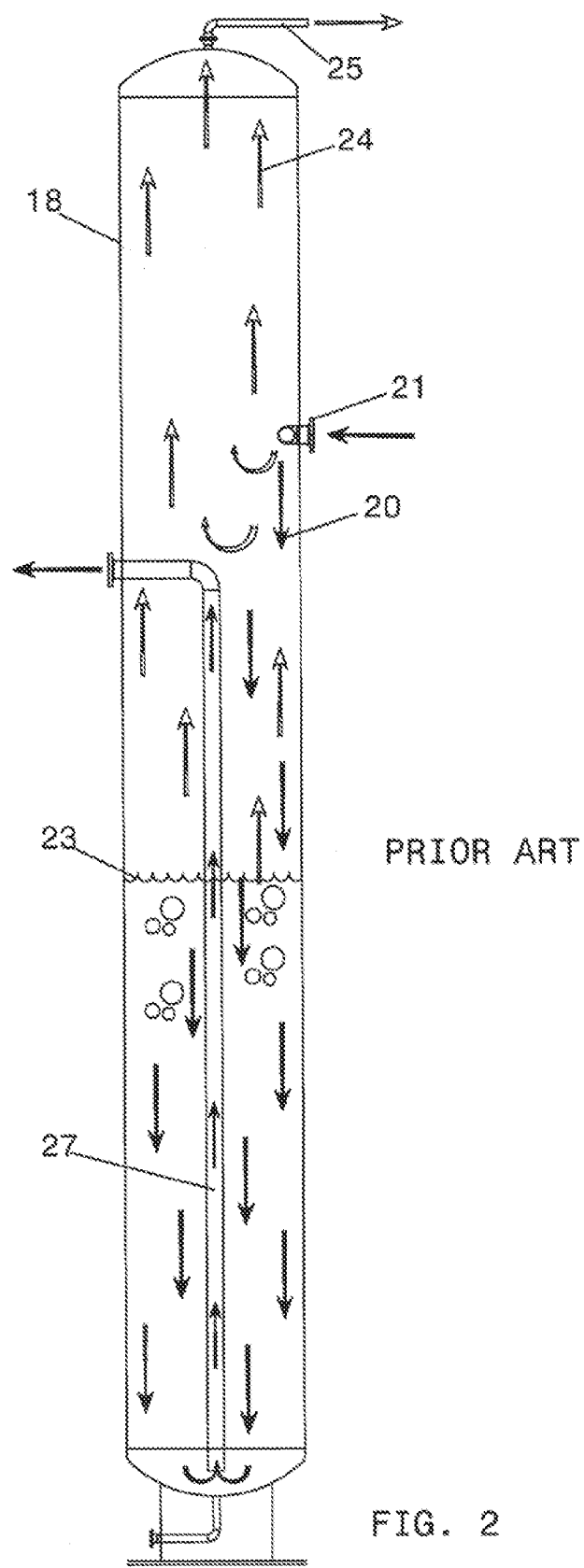
FIG. 2 is a side cross-sectional view of a prior art vapor recovery tower.

A prior art vapor recovery tower 18 is shown in FIG. 2. The tower is a vertically oriented vessel, typically made of tubular material and having capped bottom and top ends. Oil 20 flows from the separator 13 or heater treater to an inlet 21. The oil falls vertically into a pool 23 of oil. During the vertical drop, some vapors 24 leave the oil and flow up to a gas outlet 25 and on to the compressor 19 and sales line 22. When the oil contacts the pool 23, it typically still contains gas or vapors. The oil slowly moves to the bottom of the vessel wherein more gas leaves the oil and flows up. When the oil reaches the bottom of the vessel, it flows out of the outlet 27 and into a storage tank 15. The flow is typically passive so as not to require a pump; as the level of oil inside the vapor recovery tower is the same as the oil level in the storage tank. To drop the oil level in the storage tank, or a rise of oil level in the vapor recovery tower, results in oil flowing out of the vapor recovery tower into the storage tank. The vapor recovery tower 18 removes most of the vapor from the oil, without the introduction of atmospheric air. However, the vapor recovery tower 18 is ill equipped to handle surges of oil from the oil inlet and some vapor makes its way into the storage tank. The oil in the pool 23 sinks to the bottom. As the oil sinks, hydrostatic pressure on the oil increases, making gas separation difficult.

FIG. 3 shows the vapor recovery tower 17 of the present invention, in accordance with a preferred embodiment. The tower is vertically oriented. The tower has an inner vessel 31 and an outer vessel 33. The inner vessel 31 is a tube with a closed bottom end 35, or base plate, and an open top end 37. The bottom end 35 can bear on the ground or on a support structure. An intermediate portion 38 is located between the two ends 35, 37. An oil, or liquid, inlet 39 is provided near the bottom end 35 of the inner vessel 31. A heat exchanger 41 is located in the inner vessel between the oil inlet 39 and the top end 37. In the preferred embodiment, the heat exchanger 41 is a coil, through which flows compressed gas from the compressor 19. There is a compressor gas inlet 43 and a gas outlet 45. The islet 43 is located near the bottom end 35. The compressor gas inlet 43 is connected to the output of the compressor 19. The gas outlet 45 is connected to the gas sales line 22.

The interior of the inner vessel 31 forms a liquid path that extends from the oil inlet 39, past the heat exchanger 41, to the top end 37.

The outer vessel 33 surrounds and extends above the inner vessel 31. The outer vessel 33 is a tube of larger inside diameter than the outside diameter of the inner vessel 31, such that there is an annulus 47 between the inner and outer vessels. Supports 77, or alignment plates, exit from the inner vessel radially outward. The supports 77, which are located near the top end 37, maintain the inner vessel 31 in a concentric alignment with the outer vessel 33. The outer vessel has a closed, or capped bottom, end 49. In the preferred embodiment, the bottom end 49 of the outer vessel is located above the bottom end 35 of the inner vessel. This simplifies the inner vessel inlets 39, 43 and outlet 45. Thus, the annulus 47 is between the outer vessel 33 and the intermediate portion 38 and upper end 37 of the inner vessel 31. However, the inner vessel could be completely contained within the outer vessel. The outer vessel has a closed top end 51 located a distance above the top end 37 of the inner vessel. A gas outlet 53 is at the top end 51. A pipe 54 extends from the gas outlet 53 to the compressor 19. Near the bottom end 49 of the outer vessel, there is an oil, or liquid outlet 55 which connects to one or more storage tanks 15. A liquid path extends from the top end 37 of the inner vessel, through the annulus down to the oil outlet 55. The outer vessel 33 has tie-off lugs 78 located along its length and spaced around the circumference. The tie-off lugs 78 can be used to secure bracing or cabling to maintain the tower in a vertical orientation. The top end has lifting lugs 79, which may be of the pivoting type. The lifting lugs are used during installation of the tower (with a crane). The outer shell also has sensors coupled thereto by ports. The ports provide access to the interior by the sensors. There may be a temperature sensor 80 and a pressure sensor 81. The sensors can be manually read, or can send data by cables or wirelessly to other devices.

The compressor 19 has an input that is connected to the pressure sensor 81 by way of a controller 82 (see FIG. 1). The controller is programmable. When the internal pressure of the tower increases to a first predetermined pressure, the controller 82 causes the compressor 19 to operate. When the internal pressure falls below another, second, predetermined, pressure, the controller causes the compressor to stop operating. The first predetermined pressure to start operation of the compressor is selected so as not to interfere with the release of gas from oil in the tower. The second predetermined pressure, to cause the compressor to stop operating, may be less than atmospheric pressure, so as to apply a partial vacuum to the tower interior. Operating the compressor involves starting and stopping the compressor. As an alternative to stopping the compressors the compressor can be idled. As another alternative, a bypass can be used, where the gas input to the compressor is selected from the tower 17 and another source. When the tower pressure increases, the gas input is taken, from the tower. When the tower pressure is low, the gas input into the compressor comes from the other source, for example a second vapor recovery tower from another well. Although the pressure sensor 81 is shown in the figures as located in the lower portion of the tower, it can be located in the upper part, exposed to gas.

Oil 61 pools in the annulus 47. The top surface, or level 63, of oil in the annulus is a distance below the top end 37 of the inner vessel. When the oil outlet 55 is connected to a bottom region of the storage tank, the level 63 of oil in the annulus reflects the level of oil in the storage tank. The height of the top end 37 of the inner vessel is located above the top end of the storage tank 15. Thus, the level 63 of oil in the tower can follow the level of oil in the storage tank.

Alternatively, as shown in FIG. 1, the oil outlet 55 is connected to a pipe 55A at the top of the storage tank. The pipe is generally horizontal and has a top pipe into the storage tank. Oil in the annulus 47 in the tower 17 pushes oil out through the outlet 55 and up to the pipe 55A, where it drops into the tank 15. Thus, the oil level 63 in the tower 17 is above the pipe 55A. The pipe 55A can feed oil to a single storage tank. Alternatively, the pipe 55A can be a manifold that feeds oil to plural storage tanks.

In operation, oil 60 from the separator or well is introduced into the bottom of the inner vessel 31 by way of the oil inlet 39. This oil 60 typically contains gas. The oil in the bottom is displaced upwardly by incoming oil. A column of oil forms in the inner vessel. As the oil rises inside of the column formed by the inner vessel 31, it follows a first liquid path. The oil is raised in temperature by the heat exchanger 41. The heat exchanger 41 receives hot compressed gas from the compressor 19 and can increase the temperature of the oil by 20-30 degrees F. Furthermore, as the oil rises inside of the inner vessel 31, it is subjected to less and less hydrostatic pressure. The decrease in pressure and the increase in temperature present more favorable conditions to separate the gas from the oil as lowering the pressure and increasing the temperature lowers the boiling point of the liquids which flash to gas. The gas 24 bubbles out of the oil. As the gas is separated from the oil the density of the fluid in the upper end portion of the inner vessel 31 decreases, thereby further reducing hydrostatic pressure on the oil and releasing even more gasses. The warm oil rises to the top of the inner vessel, also contributing to the release of gasses through the reduction of hydrostatic pressure.

By the time the oil reaches the open top end 37 of the inner vessel 31, the oil is likely foaming because the gasses are separating and leaving the oil. The gasses travel up inside of the outer vessel to the gas outlet 53. The gasses then flow to the compressor 19.

The foam 66 spills over the edge of the top end 37 of the inner vessel 31 (see FIG. 4). The foam moves along another liquid path, namely by felling down the outside surface 67 of the inner vessel. As the foam 66 travels down the outside surface 67, the bubbles in the foam tend to break apart, releasing the gas therein and further separating gas from the oil. The outside surface 67 could be smooth. However, in the preferred embodiment, the outside surface 67 is modified to increase the surface area. Material can be subtracted from or added to the inner vessel to roughen the outside surface. Material can be subtracted from the inner vessel, as for example, by sand blasting. Alternatively, material such as expanded metal can be secured (such as by welding) to the outside surface. The falling oil enters the pool 61 of oil. The distance between the top cod 37 of the inner vessel and the top surface 63 of the pool in the annulus is sufficient to allow gasses to separate from the oil. In the preferred embodiment, the top end 37 is at least four feet above the highest top level 63 of oil in the annulus. The level 63 of oil in the annulus typically fluctuates to match the level of oil in the storage tank 15. Most storage tanks have a maximum oil height of twenty feet. Thus, the top end 37 for a typical installation is at least twenty four feet high.

If there is any gas left in the oil, the oil is foamy and sits on top of the pool until it releases its gas and descends into the pool. Oil falling along the outside surface 67 and near the top of the pool 61 may receive some heat through the wall of the inner vessel 31, which is thermally conductive, being made of steel or some other metal. This assists the oil near the top of the pool in releasing any remaining gas. As the oil cools, it descends in the annulus. By the time the oil reaches the outlet 55 in the bottom of the inner vessel the oil is "dead", without volatile gasses flashing off under normal ambient conditions. Once the oil leaves the inner vessel, it descends in the annular column to the liquid outlet 55.

Unlike the prior art, the vapor recovery tower of the present invention works with the temperature and pressure characteristics of fluid columns. The prior art vapor recovery tower of FIG. 2 confines the separation, portions or zones to the distance between the oil inlet 21 and pool level 23, when the oil is falling. It is believed that most of the gas separation occurs on the fall. While some gas may separate when the oil is at the top of the pool, as the oil drops down in the pool, the hydrostatic pressure increases and the temperature cools, both factors that retard, rather than provide, gas separation.

In contrast, the vapor recovery tower 17 of the present invention flows the oil up, not down, in the fluid column in the inner vessel, thus using temperature and pressure to an advantage to separate the gas. The pressure is decreased and the temperature increased at the top of the inner vessel fluid column. The heat exchanger 41 further increases the temperature of the oil. When the oil is allowed to fall into the other vessel pool or column, it is not a free fall, but slowed by flowing along the outside surface 67 of the inner vessel. All of these factors contribute to the separation of gas from the oil.

The dead oil is drawn out of the vapor recovery tower 17 into the storage tank as with conventional vapor recovery towers 18. As the oil level in the storage tank fills, it draws oil out of the vapor recovery tower. Alternatively, a rise in oil level in the vapor recover tower can posh oil out of the tower into the storage tank. The level 63 of oil in the vapor recovery tower follows the oil level in the storage tank.

The vapor recovery tower 17 is sized according to the particular application. In general, the oil should be retained in the vapor recovery tower, whether in the inner vessel or the outer vessel, for a sufficient time to separate the gas from the oil. This typically depends on the characteristics of the oil, gas and the well. In general, vapor recovery towers have retention times of at least thirty minutes, unless the particular circumstances require a different retention time. Sizing includes sizing the inner and outer vessels 31, 33.

The vapor recovery tower 17 is particularly well suited, to surges of oil produced. If excess oil enters the bottom of the inner vessel 31, it merely pushes into the foamy upper portion, which can absorb the extra volume of oil. Also, if any foam is spilled over the top end 37 of the inner vessel, it descends along the outside surface 67 where it can continue to release gas.

The vapor recovery tower can be provided with sight glasses 65 at various heights therein.

The vapor recovery tower uses the heat of the compressed gas for the heat exchanger 41. This is a particularly efficient way of operating the heat exchanger. However, other types of heat exchangers can be used. For example, diesel fuel can be burned to create a hot feud which circulates through, the heat exchanger 41. Or any other hot liquid, or gas can be introduced from various sources an operator may have. Another example involves using the warm oil and gas directly from the well to flow through the heat exchanger, before the oil and gas is processed by an initial piece of equipment, such as the heater treater 13 or separator. Still another example uses heated fluids, such as oil, from the heater treater 13, which heated fluids flow through, the heat exchanger 41.

If a compressor is not used, the gas can be stored in other ways or simply flared off.

Figure 5:
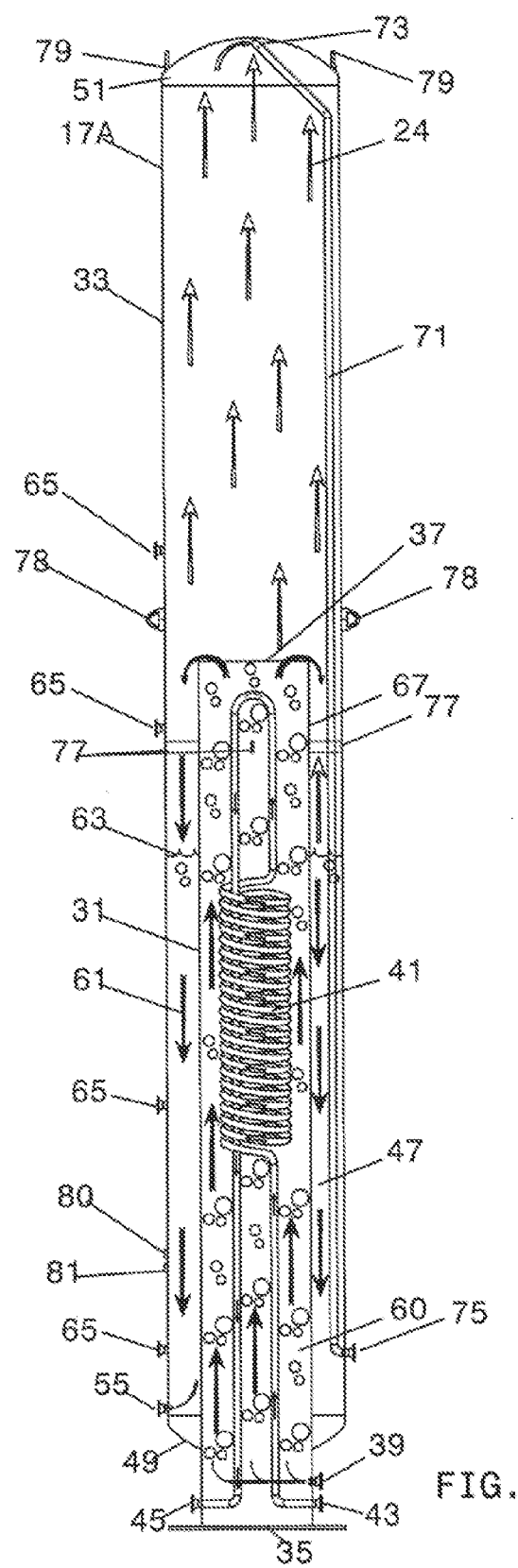
FIG. 5 is a side cross-sectional view of the vapor recovery tower, in accordance with another embodiment.

FIG. 5 shows a vapor recovery tower 17A in accordance with another embodiment. The inner and outer vessels 31, 33 are the same. In the vapor recovery tower 17 of FIG. 3, the gas outlet 53 is located outside of the tower. With regard to the vapor recovery tower 17A of FIG. 5, the gas outlet 71 in located inside of the tower. The gas outlet 71 is a pipe having an inlet 73 at the top end 51 of the tower. The pipe 71 extends down along an inside of the outer vessel, entering the annulus 47 and then exiting the tower near the bottom at a fitting 75. The exit fitting 75 is located close to ground level. The pipe 54 is coupled to the fitting 75 and extends to the compressor 19.

The tower 17A of FIG. 5 has several advantages. Installation is simplified and less costly. With the fitting 75 located near ground level instead of on top of the tower, personnel can access the fitting without an aerial lift to attach the pipe to the compressor. Also, extending the pipe 71 inside the tower maintains the exit gas at a higher temperature so that the gas is less likely to condense before entering the compressor. The pipe 71 is exposed to the higher temperatures of the oil and gas inside the tower. In colder environments, maintaining the gas at a higher temperature is a noticeable advantage.

Although the preferred embodiment has been described as having an inner first fluid path or column, where the fluid rises, and an outer second fluid path or column, where the liquid sinks, this could be in some other configuration. For example, the first fluid path or column, could be on the outside, surrounding an inner second fluid path or column. Thus, the fluid would rise in the outer fluid path or column and descend in the inner fluid path or column. As another example, the two paths or columns need not be concentric, but could be adjacent to one another. If the two columns are adjacent to one another, there could be two towers, side by side. A conduit or channel connects the first column to the second, column to allow liquid in the first column to spill over or enter the second column. Gas would either be collected from the upper end of each column, or the gas from one column allowed to flow into the other column, wherein gas could be collected from a single column. In this example, the first column or vessel would have an upper vessel end and an upper liquid end; the upper vessel end is above the upper liquid end. Still another example for side by side columns is a single tower with a vertical partition. The partition divides the tower interior into the first and second columns, with fluid rising in the first column and spilling over the top end of the partition into the second column. The fluid level in the second column is below that of the first column. Gas rises to the top of the tower for removal.

The foregoing disclosure and showings made in the drawings are merely illustrative of the principles of this invention and are not to be interpreted in a limiting sense.

The invention claimed is:

1. A vapor recovery apparatus for processing liquid produced from a well, the produced liquid containing gas, comprising:
   a) an inner vessel having a lower end, an intermediate portion, a liquid inlet, a liquid outlet, a first liquid path between the liquid inlet and the liquid outlet, the inner vessel liquid outlet being vertically above the liquid inlet;
   b) an outer vessel having a closed lower end and a closed upper end and an interior, the inner vessel liquid outlet and inner vessel intermediate portion located in the outer vessel interior, the inner vessel liquid outlet communicating with the outer vessel interior, an outer vessel liquid outlet located in a lower portion of the outer vessel, a gas outlet at the outer vessel upper end;
   c) a heat exchanger located so as to provide heat to liquid located in the first liquid path;
   d) a second liquid path extending from where the liquid enters the outer vessel from the inner vessel to a liquid level in the outer vessel.

2. The vapor recovery apparatus of claim 1, wherein the inner vessel lower end is located exteriorly of the outer vessel.

3. The vapor recovery apparatus of claim 2, wherein the liquid inlet is exterior of the outer vessel.

4. The vapor recovery apparatus of claim 2, wherein the heat exchanger comprises a heat exchanger inlet and a heat exchanger outlet, the heat exchanger inlet and the heat exchanger outlet located exteriorly of the outer vessel.

5. The vapor recovery apparatus of claim 1, wherein the inner vessel comprises an outer surface located in the outer vessel interior, the second liquid path, comprises the inner vessel outer surface.

6. The vapor recovery apparatus of claim 5, wherein the inner vessel outer surface is roughened so as to have a larger surface area relative to a smooth surface.

7. The vapor recovery apparatus of claim 1, wherein the gas outlet is connected to a gas pipe, the gas pipe extending through the outer vessel interior to a location near the outer vessel bottom end, wherein, the gas pipe exits the outer vessel.

8. The vapor recovery apparatus of claim 1, wherein the heat exchanger is located inside of the inner vessel, in the first liquid path.

9. The vapor recovery apparatus of claim 1, further comprising a compressor, the compressor receiving gas from the gas outlet, the compressor providing compressed gas to the heat exchanger.

10. The vapor recovery apparatus of claim 1, further comprising a liquid storage tank having an inlet that is connected to the outer vessel liquid outlet.

11. The vapor recovery apparatus of claim 10, wherein the storage tank has a first level of liquid therein, the outer vessel has a second level of liquid that is the same as the first level of liquid.

12. The vapor recovery apparatus of claim 1 farther comprising an annulus between the outer vessel and the inner vessel intermediate portion.

* * * * *